United States Patent [19]

Yokota

[11] Patent Number: 5,042,877
[45] Date of Patent: Aug. 27, 1991

[54] ARRANGEMENT OF ARM REST IN AUTOMOTIVE SEAT

[75] Inventor: Masaaki Yokota, Akishima, Japan
[73] Assignee: Tachi-S Co. Ltd., Tokyo, Japan
[21] Appl. No.: 492,675
[22] Filed: Mar. 13, 1990
[51] Int. Cl.⁵ ............................................. A47C 7/54
[52] U.S. Cl. ................................... 297/411; 297/417
[58] Field of Search ............... 297/417, 411, 422, 113, 297/420, 421, 115, 325

[56] References Cited

U.S. PATENT DOCUMENTS

| 3,807,799 | 4/1974 | Freedman | 297/417 |
| 4,466,664 | 8/1984 | Kondou | 297/417 |
| 4,848,840 | 7/1989 | Toya | 297/417 |
| 4,850,644 | 7/1989 | Kazaoka et al. | 297/325 |

Primary Examiner—Kenneth J. Dorner
Assistant Examiner—Milton Nelson, Jr.
Attorney, Agent, or Firm—Oldham & Oldham Co.

[57] ABSTRACT

An arrangement of an arm rest in an automotive seat, with a collar interposed via a support rod between the arm rest and lateral wall of the seat, wherein the collar is formed to conform to the curved surface of that lateral wall of the seat, to thereby prevent creation of the clearance and thus avoid objectionable view of the support rod in the collar.

4 Claims, 2 Drawing Sheets

ARRANGEMENT OF ARM REST IN AUTOMOTIVE SEAT

BACKGROUND OF THE INVENTION

1. Field of the Invention

The present invention relates to an arrangement or structure for mounting an arm rest in an automotive seat, and is particularly directed to an arm rest structure which avoids a clearance between a seat back and arm rest, which is created in such an automotive seat wherein the arm rest is rotatably pivoted on the curved or obliquely formed lateral surface of the seat back.

2. Description of Prior Art

In a hitherto automotive seat with a rotatable arm rest of such structure wherein the arm rest is rotatably mounted by a support rod to the curved or obliquely formed lateral surface of the seat back, it has been found that a defective clearance is created between the arm rest and such uneven lateral surface of the seat back, which exposes a view of the support rod through the junction between the arm rest and seat back, presenting an objectionable point in the aesthetic appearance of the seat.

To alleviate this problem, there has been known such conventional arm rest arrangement as shown in FIGS. 1 and 2, in which a collar (3') is provided between an arm rest (a') and a curved lateral wall (51') of a seat back (SB'). The collar (3') is attached to a support rod (1') in a freely rotatable way such as to be interposed between the arm rest (a') and the curved lateral wall (51'), as a means for concealing the support rod (1') from external view.

However, as shown, the collar (3') is formed merely in a thin or low cylindrical shape, and as a result, during vertical rotation of the arm rest (a') relative to the curved lateral wall (51') of the seat back (SB'), as can be seen from FIG. 1, the support rod (1') is still exposed partially to view between the curved lateral wall (51') and collar (3'). Stated more precisely, the cross-section length of such cylindrical collar (3') presents a rectilinear lateral line with respect to the outwardly, curved arc of the lateral wall (51') of the seat back (SB'). This arc is so formed as to extend in a direction from a rear wall (52') to a front wall (53') of the seat (SB') as viewed from FIG. 1, and as such a clearance (W) is still created between the collar (3') and the lateral wall (51'), giving an objectionable view of the support rod (1) in the seat.

Additionally, due to the rotatability of the collar (3'), the contact between the collar (3') and either of the lateral wall (51') and the inner wall of the arm rest (a') causes a tear or cracking flaw on those wall areas, which also impairs the appearance of the seat.

SUMMARY OF THE INVENTION

With the above drawback in view, it is therefore a purpose of the present invention to provide an improved arrangement of an arm rest in an automotive seat which avoids the creation of a clearance through which a support rod is exposed to view.

In attaining the purpose, in such a type of seat wherein an arm rest is rotatably mounted to a seat back by a support rod, the seat back including a curved lateral wall having an outward curvature extending in a direction from the rear wall to the front seating surface of the seat back, the present invention comprises a collar through which the support rod passes, a stopper pawl which is secured by said support rod in the collar, a back garnish member provided rearwardly of the seat back, wherein the collar is so formed that its one side edge has a contour conforming to the curved lateral wall of the seat back and its other side edge has a contour conforming to the inner lateral wall of the arm rest, wherein the collar is further provided with a securing part to be secured between the back garnish member and the rear wall of the seat back, and wherein both collar and stopper are interposed between the arm rest and rear wall of the seat back, to thereby prevent the support rod from being viewed externally.

Another aspect of the present invention is the collar being prevented from rotating by a stopper fixed on the support rod which is secured firmly in the collar, and at the same time it is, prevented against sliding movment along the longitudinal direction of the support rod by virtue of the securing part of the collar being secured between the back garnish member, and the lateral wall of the seat back. Thus, the collar is positively retained unmoved between the seat back and arm rest, which insures avoiding such tear or scratching flow on a part of the seat.

DETAILED DESCRIPTION OF PREFERRED EMBODIMENT OF THE INVENTION

Figure 3:
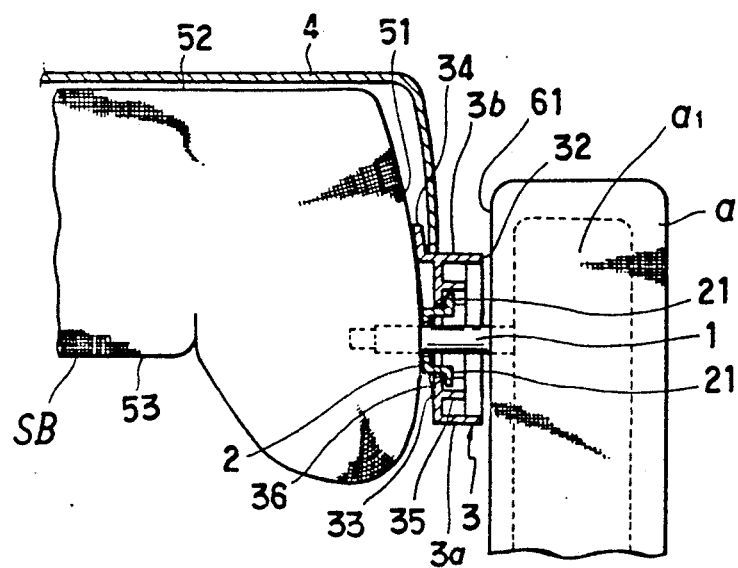
FIG. 3 is a schematic, partially sectional view of an arm rest arrangement in accordance with the present invention.
Figure 4:
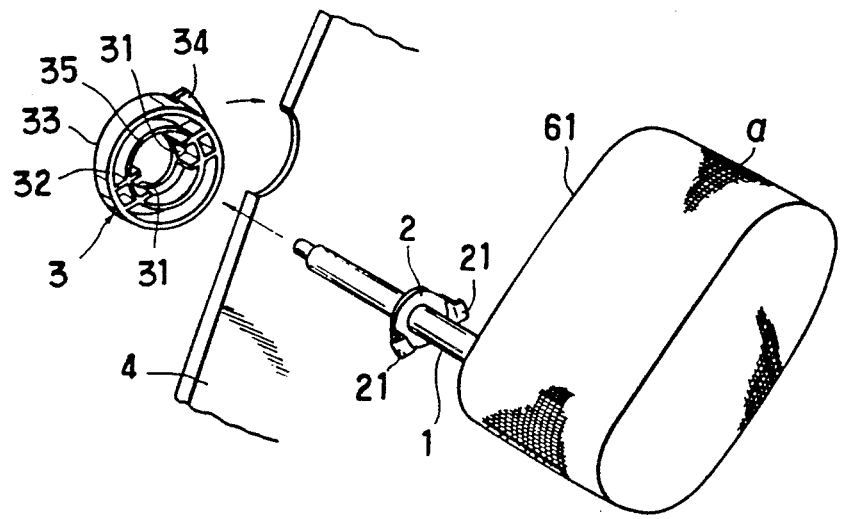
FIG. 4 is a partially broken, exploded perspective view of the same arm rest arrangement.
Figure 5:
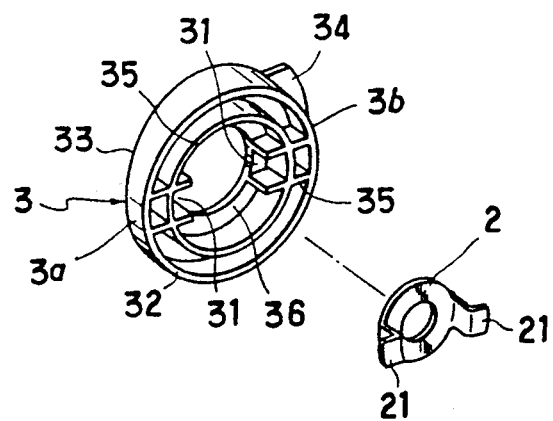
FIG. 5 is an exploded perspective view of a collar and a stopper in accordance with the present invention.

Referring to FIGS. 3 through 5, these FIGS. are illustrative of an arrangement of arm rest in accordance with the present invention.

Figure 1:
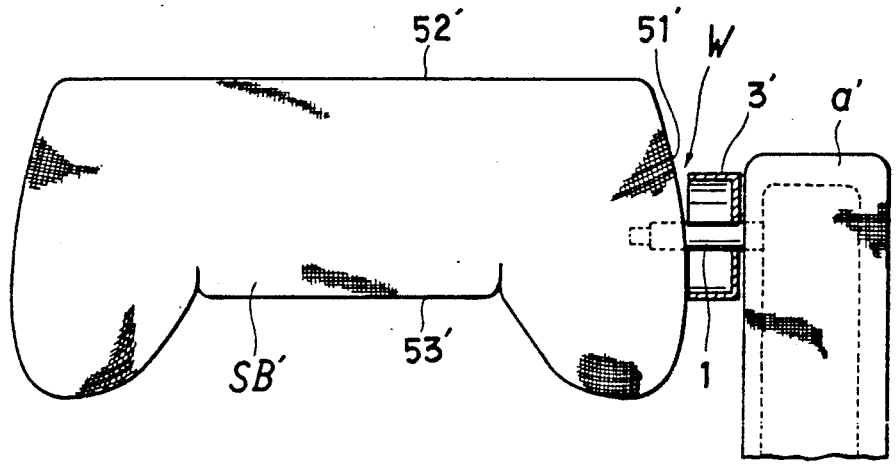
FIG. 1 is a schematic, partially sectional view of a conventional arm rest arrangement.
Figure 2:
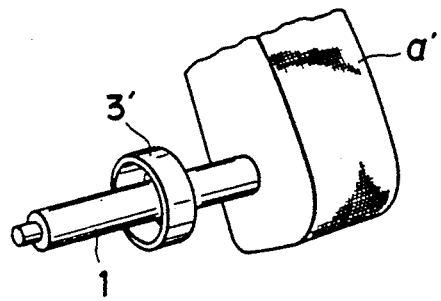
FIG. 2 is partly broken view of the conventional arrangement, showing that an ordinary collar is provided therein.

Designation (SB) represents a seat back to which is applied the present invention, in which as in FIG. 1, the lateral wall (51) is formed in such outwardly curved contour, similarly to that (51') of the previously stated prior-art seat back (SB'), which extends in a direction from the rear wall (52) to the front seating surface (53) of the seat back (SB), as viewed from FIG. 1.

A support rod (1) is provided fast in the seat back (SB) such that the rod (1) projects externally from such curved lateral wall (51) of the seat back (SB). To the outward free end of the support rod (1), is rotatably secured an arm rest frame (a1) of an arm rest (a) so that the arm rest (a) is free to rotate vertically between an upright non-use position and a horizontal use position with respect to the lateral wall (51) of the seat back (SB).

A stopper (2) is welded, generally, to the midway part of the support rod (1), which is located between the arm rest (a) and lateral wall (51). The stopper (2) is of a circular shape and formed at its periphery with a pair of opposed stopper pawls (21)(21) each extending vertically from the body of the stopper (2) a small distance towards the inner wall (61) of the arm rest (a) and terminating in an outwardly, horizontally extending edge, as shown.

Figure 6:
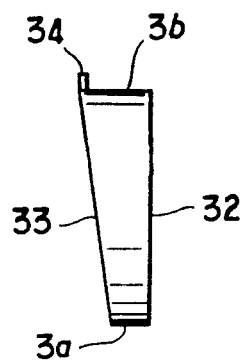
FIG. 6 is a side view of a collar in accordance with the present invention.

Designation (3) stands for a collar made of a synthetic resin. The formation of the collar (3) is, as best seen from FIG. 6, such that its body per se is basically formed in a cylindrical shape, but the inner side (33) thereof, which is to face and contact the lateral wall (51) of the seat back (SB) as will be stated later, is cut obliquely along its longitudinal cross-section in a manner conforming generally to the curvature or inclination angle of the curved or oblique surface defined by that lateral wall (51) of the seat back (SB), thereby providing a sloped plane in this particular inner side (33), whereas the outer side (32) thereof has a uniformly horizontal or flat plane as opposed to such sloped plane of the inner side (33). Further, thus-formed collar (3) is perforated at its center axis a hole (36) having a diameter generally equal to the outer diameter of the stopper (2), and formed integrally with a circular reinforcing rib (35) such as to be defined between the peripheral edge of the collar (3) and inner edge of the hole (36). At the opposite sides of the hole (36), are respectively provided a pair of securing compartments (31)(31) in a manner integral with the collar body (3) and reinforcing rib (35).

The collar (3) is also provided integrally with a securing protrusion (34) part-way at the outer edge of the inner side (33) thereof.

Referring to FIGS. 3 and 4, prior to securing the support rod (1) in the lateral wall (51) of the seat back (SB), the collar (3) is secured by being fast inserted in between inner wall of arm rest of a back garnish member (4) and lateral wall (51) of the seat back (SB), at a given securing point of the arm rest (a). Then, the support rod (1) is inserted through the hole (36) of the secured collar (3) so that the stopper (2) passes through the hole (36) with its two stopper pawls (21)(21) being received in place within the respective securing compartments (31)(31) of the collar (3) as understandable from FIGS. 4 and 5. Consequently, as shown in FIG. 3, the arm rest (a) is rotatably secured to the lateral wall (51) of the seat back (SB) by the collar (3) and the stopper (2), and it is appreciated that the sloped inner side (33) of the collar (3) rests on the curved lateral wall (51) generally in conformity therewith, while the flat outer side (32) of the same lies in a slidable contact with the flat inner lateral wall (61) of the arm rest (a), whereupon the collar (3) is neatly or fit interposed between the lateral wall (51) and arm rest (a), sufficiently to conceal the support rod (1) from external view. Thus, the support rod (1) is prevented from being viewed from outside of the seat back (SB).

Particularly, in the case of the illustrated seat back (SB) of an ordinary type including such curved lateral wall (51) having the curvature increasing its degree from the rear wall (52) to the front seating surface (53) of the seat back (SB), the low peripheral wall (3a) of the collar (3) serves to render narrower the distance between the lateral wall (51) and arm rest (a) at the front half of the seat back (SB) as can be viewed from FIG. 1, and therefore, the clearance between the seat back (SB) and arm rest (a) is reduced to the smallest possible degree, which permits for giving such an aesthetically improved appearance of a seat as if the arm rest (a) was integrally provided on the seat back (SB) without a clearance therebetween.

It is to be appreciated further that the collar (3) is prevented against rotation by virtue of the the two stopper pawls (21)(21) of the stopper (2) fixed on the support rod (1) being secured in the respective two securing compartments (31)(31) of the collar (3), and at the same time, the collar (3) is prevented against sliding movements on the support rod along its longitudinal direction, by virtue of the securing protrusion (34) of the collar (3) being retained and unmoved between the lateral wall (51) and the back garnish member (4).

Advantageously, the collar (3) is firmly secured by both stopper (2) and back garnish member (4), and thus, the arm rest arrangement of the present invention is of a robust structure having enough durability against a long period of use.

While the description has been made as above, it should be understood that the present invention is not limited to the illustrated embodiment, but any other modifications, replacements and additions may structurally be possible without departing from the spirit and scope of the appended claims. For instance, depending on the contour of the lateral wall (51) of the seat back (SB), the inner side (33) of the collar (3) may be formed in any other uneven plane conforming thereto.

What is claimed is:

1. An arrangement for an arm rest in an automotive seat having a seat back to which said arm rest is rotatably mounted by a support rod, said seat back including a curved lateral wall having an outward curvature extending in a direction from a rear wall of said seat back to a front seating surface of said seat back, said arrangement comprising:

a collar through which said support rod passes;
a stopper means secured in said collar, said stopper being fixed on said support rod; and
a back garnish member provided rearwardly of said seat back, wherein said collar is so formed that its one side edge has a contour conforming to said curved lateral wall of said seat back and its other side edge has a contour conforming to a wall of said arm rest which faces towards said lateral wall of said seat back, wherein said collar is further provided with a securing part which is secured between said back garnish member and said lateral wall of said seat back, wherein said collar and stopper are interposed between said arm rest and said lateral wall of said seat back, to thereby prevent said support rod from being viewed externally, and wherein said lateral wall of said seat back has an outward curvature that increases in degree from said rear wall to said front seating surface of said seat back, wherein said wall of said arm rest is formed flat, and wherein said one side edge of said collar is so formed as to have a sloped plane in conformity with said outward curvature of said lateral wall of said seat back, while said other side edge of said collar is formed flat in conformity with said flat formed wall of said arm rest.

2. The arrangement as defined in claim 1, wherein said collar is formed in a cylindrical shape, having formed therein a reinforcing rib and securing compartment in an integral manner, said securing compartment being adapted for receiving said stopper supportively, and further said collar has at its center a hole through which said support rod passes.

3. The arrangement as defined in claim 2, wherein said stopper is formed with a pair of opposed stopper pawls, and wherein said pair of opposed stopper pawls are respectively received in said pair of securing compartments.

4. The arrangement as defined in claim 1, wherein said collar is made of a synthetic resin material.

* * * * *